Figure 1:
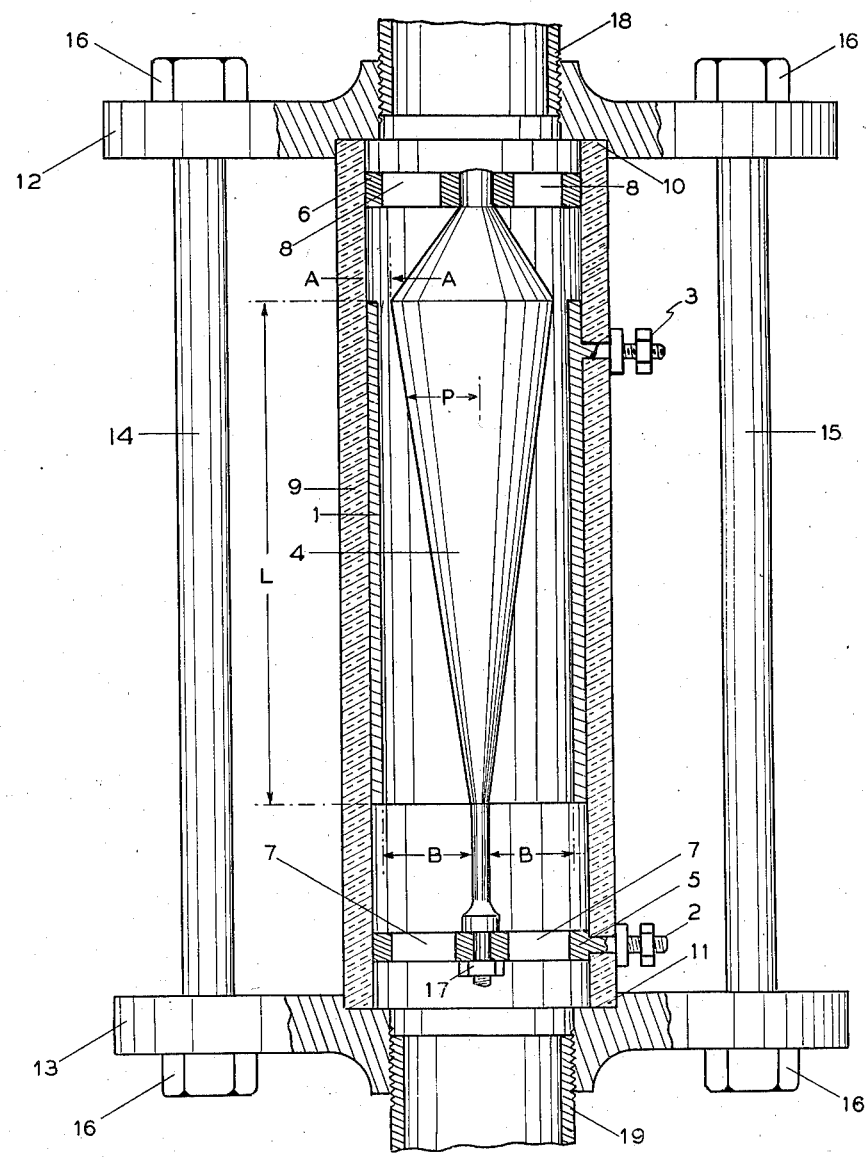

Patented Sept. 7, 1937

2,092,491

UNITED STATES PATENT OFFICE 2,092,491

METHOD AND APPARATUS FOR ELECTRICAL DEMULSIFICATION

Gale L. Adams, Los Angeles, and Roy G. Barlow, Rivera, Calif., assignors to Socony-Vacuum Oil Company, Incorporated, New York, N. Y., a corporation of New York Application September 30, 1935, Serial No. 42,978

2 Claims. (Cl. 204—24)

This invention relates to the electrical dehydration of fluids particularly crude petroleum emulsions containing water as the dispersed phase.

Emulsified water is present in most of the petroleum produced from pumping oil wells and constitutes a serious problem to the producer. The emulsion will, in many cases, separate from the bulk of the oil, but the separated layer retains so much oil that it cannot be discarded as a waste product, it oftens contains material proportion of mud, and the water is usually highly mineralized.

It has been proposed to treat petroleum emulsions by subjecting them in a tank treater to the influence of an electrostatic field of high potential—of the order of 11,000 volts upwardly—usually with recycling and/or addition or dilution with dry oil to prevent current flow. This type of equipment presents inherent difficulties from the operating standpoint, such as difficulty in maintaining insulation, fire hazard, short circuits and intermittent current surges, commonly called "chaining", with consequent necessity of automatic apparatus to interrupt these surges, elaborate and costly apparatus and impossibility of operating on oils containing a high percentage of water. These high voltage systems normally function under conditions verging on failure, and to insure reasonably continuous operation, their design must be both elaborate and expensive.

Our invention is based upon the discovery that effective resolution of emulsions of the type described can be accomplished by establishing a flowing stream of emulsion, passing electric current across the flowing stream of emulsion throughout a substantial length of the emulsion stream, and maintaining the electric current density approximately the same at the various points in the emulsion stream.

Our invention effects a separation of crude petroleum emulsion into its separate phases by passage of the emulsion through a continuous flow stream treater distinct and unique from treaters proposed or operating under the present state of the art. The primary distinctive feature of a true flow stream treating unit is that the cross sectional area is of the same order of magnitude as that of the entering and exit lines to and from such unit.

In accordance with our invention, resolution of the emulsion is accomplished by passing the emulsion in a relatively thin flowing stream between diverging electrodes of appreciable length. An important feature of our process consists in passing a flowing stream of crude petroleum emulsion between concentric electrodes of opposite polarity suitably connected to a source of electrical energy and one or both of said electrodes being so tapered as to afford a substantially uniform electrical resistance path during the progressive resolution of said emulsion as it flows at a decreasing rate with consequent realignment of dispersed water particles through the annular path of increasing cross sectional area, and separating the products of such resolution in a subsequent quiescent settling stage.

When this procedure is followed, resolution is initiated in the narrow end of the annulus and the emulsion is thereby rendered slightly conductive; the current flow thereby permitted results in progressive resolution of the emulsion with a progressive increase in its conductivity. While resolution is thus taking place the emulsion stream is moving through the annulus from its narow to its wide end, i. e., from a region of close spacing to a region of relatively wide spacing of the electrodes, and if the angle of divergence of the electrodes be properly related to the characteristics of the emulsion being treated and to the applied potential, the rate of increase in electrical conductivity may be so brought into balance with the rate of increase in electrode spacing as to maintain a substantially uniform current density through the emulsion stream throughout the length of the annulus.

By the use of the method and apparatus of this invention even the most stubborn emulsions may be resolved in large quantity in apparatus of low cost and limited compass, with the avoidance of insulation difficulties, fire hazard, gas evolution, electrode encrustation, short circuiting and flash-overs.

Figure 2:
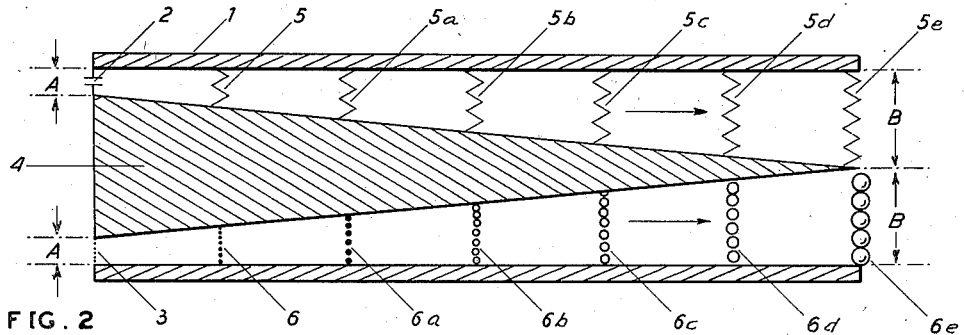
Figure 3:
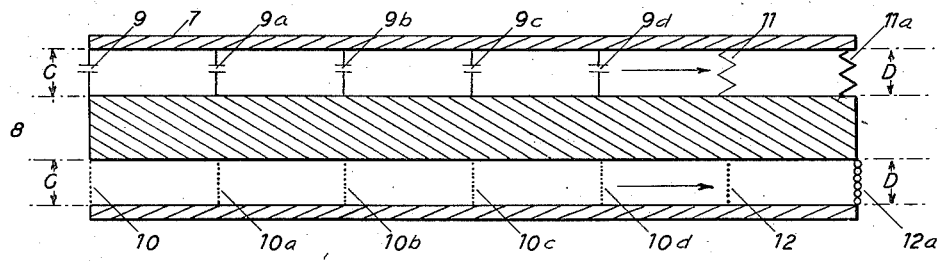
Figure 4:
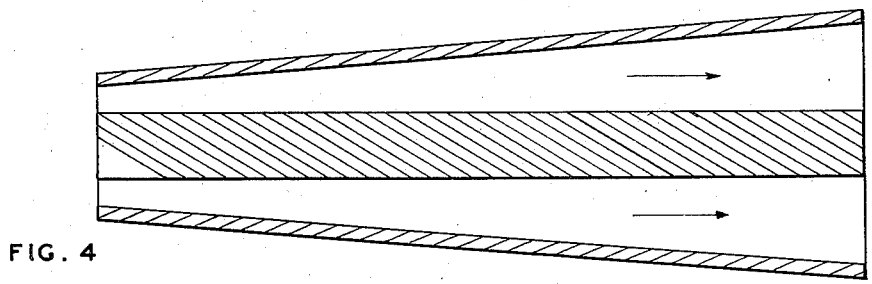

The principle of the invention will best be understood with reference to the attached drawings and the following description thereof, in which Fig. 1 is a longitudinal section of an electrode combination embodying our invention and adapted to carry out the process of our invention; Fig. 2 is a diagram illustrating the electrical and mechanical functioning of the electrodes of Fig. 1 in the practice of our process; Fig 3 is a diagram illustrating the operation of a type of electrode combination heretofore proposed, this figure being given to aid in defining our invention; and Fig. 4 is a diagram illustrating an alternative electrode combination embodying our invention.

Reference to Fig. 1 will serve to show how the essential features of our process are accomplished. A cone of length L and pitch P is centered in sleeve 1. In this manner, an annular space of A entrance width and B exit width is afforded. Emulsion flows from A to B and a flooded condition is maintained either by application of back pressure beyond the exit B or by inverting the unit. Terminals 2 and 3 are provided for connection to a source of electrical energy, not shown, to impress a potential difference between sleeve 1 and cone 4. In practice, one terminal will be grounded for safety. In the event that A is sufficiently small, voltage may be applied direct from a 440 volt alternating current line. Also, direct current may be used by incorporating necessary voltage control in the circuit.

Direct current produces a satisfactory degree of resolution in many cases, but only when the emulsion is substantially free from solids and colloids. In the numerous cases in which such bodies are present the cataphoretic effect which is inseparable from the use of direct current is liable to cause rapid encrustation of the negative electrode with attendant heating and voltage drop; the common presence of salts in the water of the emulsion introduces a liability to electrolysis and the disengagement of acid and corrosive gases, while in all cases polarization is a constantly recurring difficulty.

We avoid cataphoresis and polarization and materially reduce electrolysis by the use of alternating current, and while it is often possible to use direct current under favoring conditions, we prefer to use alternating current because of its less cost and greater ease of handling and control. For emulsions containing any appreciable proportion of solids alternating current is almost essential, and the alternations must be sufficiently rapid to prevent any material migration of solids toward either electrode. For most emulsions commercial alternations of 50 or 60 cycles are sufficiently rapid to prevent objectionable cataphoresis.

Reverting to the drawings, axial alignment of cone 4 and sleeve 1 is maintained by spiders 5 and 6 which are positioned at or near the ends of insulating cylinder 9. This cylinder rests in gasketed circular grooves 10 and 11 recessed into supporting flanges 12 and 13. These flanges are spaced by shouldered rods 14 and 15 and held in place by nuts 16—16. Openings 7 and 8 in spiders 5 and 6 allow passage of oil. The normal electrical leakage paths A—8 and B—7 along insulating cylinder 9 are washed water-free by being continually swept by the rapidly moving emulsion stream. This feature constitutes an important improvement in insulation design. Nut 17 secures the lower extremity of cone 4 in spider 5. Pipes 18 and 19 provide for oil entrance and exit respectively.

Oil entering the annular treating zone at A flows through the path between the electrodes 1 and 4 at a decreasing velocity, due to the divergence of the electrodes. The variables which are encountered in our unit are: Time of treatment which is dependent on volumetric rate of flow, annulus widths A and B and length L; electrical characteristics which are dependent on applied voltage, degree of taper and characteristics of the emulsion. All of these variables are under complete control except the character of the emulsion being treated. To render the unit universal in its application it is necessary only to vary one or more of the several controllable factors to meet the requirements for complete resolution of any given emulsion.

To illustrate diagrammatically the electrical functioning of our invention, reference is made to Fig. 2. A cone 4 is centered in a sleeve 1 and a suitable potential difference maintained therebetween by any source of electrical energy not shown. It is assumed that the various controllable variables above mentioned have been selected to afford complete and efficient resolution for any particular emulsion.

Crude emulsion enters at A—A and resolution products are discharged at B—B. Immediately upon entering the charged zone as at 2—3 a condition of electrical stress is set up, represented at 2 by the condenser symbol denoting reactance and at 3 by the physical analogy of non-contiguous conductive water spheres, film surrounded and dispersed within the continuous oil phase. It should be remarked that the reactance is of such degree as to preclude measurable current flow.

Upon entry into the charged zone 2, 3, the emulsion becomes conductive. It is probable that the films surrounding the water particles become stressed to the point of rupture, providing a current path between electrodes 1 and 4 through the water. This state is designated at 5 by the symbol illustrating the physical condition wherein water droplets are now contiguous and film ruptured at the instant current starts to flow. This constitutes the beginning of progressive water droplet enlargement.

Thus a certain degree of agglomeration of water particles takes place with the result that, either with or without healing of the protective film, progressively larger water drops align themselves across the progressively and uniformly increasing physical path to afford new current paths of greater actual length, but of equal electrical resistance. For the purpose of illustration, such progressive action is pictured in electrical symbols 5a, 5b, 5c, 5d, 5e, and physical symbols 6a, 6b, 6c, 6d, and 6e. It is understood that such action is continuous, being shown in stages merely for the purpose of illustration. In actual practice, the taper of cone 4 is so chosen as to permit uniform current distribution over the annulus section designated 5 to 5e inclusive. For complete resolution of emulsion leaving 5e—6e, it is further necessary to provide a sufficient time factor of treatment which is governed by the length of cone 4.

As resolution progresses, the decreased velocity between the diverging electrodes aids in preventing reemulsification. This feature constitutes a distinct advantage over configurations of electrodes where the velocity between the electrodes is constant or increasing.

It will be seen from the foregoing that our method of emulsion treatment is distinct from the high voltage methods heretofore proposed and our apparatus is different from various types previously disclosed utilizing, for example, flared ejector nozzles designed to recirculate partially treated drier oil through the treating zone to prevent the formation of conductive water chains.

The electrode structure according to our invention is functionally distinct from any electrode combination in which the electrodes are parallel or are converging in the direction of emulsion flow, as may be explained more clearly by reference to Fig. 3. The instant voltage is applied to the flowing stream all points along the annulus present an equal electrical resistance. At some point along the path, assuming sufficient voltage, films separating water particles are broken down with resultant current flow. We have found that, as a consequence, the current flow established at whatever point moves to near the exit end of the annulus and, from that time, assuming applied voltage is constant, no current can flow through the emulsion at any point other than at or near the annulus exit. This steady state of operation is depicted in Fig. 3. Emulsion enters the treating zone between sleeve 7 and cylinder 8 at C—C and exits at D—D. Condenser symbols indicating reactance are shown at 9, 9a, 9b, 9c, 9d, while analogous physical conditions of non-contiguous water spheres, film surrounded and oil separated, are shown at 10, 10a, 10b, 10c, and 10d. Current concentrated near the end of the treating zone is represented by the resistance symbols 11—11a and comparable physical symbols 12—12a.

Confirmation of this theory has been repeatedly obtained in practice by the concentration of corrosion upon the brass electrodes used experimentally, indicative of heavy current flow at or near the exit end of sleeve 7 and cylinder 8. This is in marked contrast to the uniform distribution of corrosion exhibited over practically the entire surface of sleeve 1 and cone 4 of Fig. 2.

With current flow limited to a narrow section, as in the case of the operation illustrated in Fig. 3, efficient resolution cannot be accomplished. It has been our experience that, using a 50-cycle alternating current supply, it is necessary to provide sufficient treating time to insure from 15 to 25 cycles between entrance and exit of the emulsion from the active treating zone, a condition not attained in the operation illustrated in Fig. 3 where the current flow is concentrated along a very short length of the emulsion path.

Also, this type of operation is unsatisfactory in that it is very difficult to maintain any semblance of constant voltage or, as a direct corollary, constant current. Our invention, on the other hand, makes possible the maximum resolution with a minimum expenditure of energy by properly and effectively distributing and limiting such current flow as described above, and makes possible effective control of treating time and substantially constant voltage and current.

In our invention, we have proportioned the flowing stream of emulsion to the voltage required for complete resolution, and we thereby cause a steady uniformly distributed current to flow across the emulsion stream.

In carrying out our invention, the degree of electrode taper producing the most even distribution of current cannot be predicted for an unknown emulsion but must be found by trial. Good results have been obtained with tapers varying from 1:5 to 1:25, the steeper pitches being better adapted to very wet emulsions. This selection admits of considerable latitude. The most desirable spacing between the electrodes is that which permits the potential difference to be maintained at a low figure. This, of course, differs widely with the characteristics of the emulsion, for example at ⅛" annulus (at entering end) may require from 100 to as high as 3,000 volts to produce conductivity, though the latter figure is unusual and the ordinary average is between say 300 and 1,500 volts. The potential difference being a function of the thickness of the layer at the entering end, the annulus width may be adjusted by substituting an inner electrode of different diameter to permit any desired potential difference. Good results have been had with annuli ranging from 1/16" to ¾" at the entering end and it is not known that even these figures are limiting.

In the above descriptions reference has been made solely to electrode forms circular in cross section. Such forms, while obviously convenient, are by no means essential, it being permissible to use electrodes of any geometric figure provided the cross section of each electrode is identical in form. Again, the inner electrode need not be uniformly tapered as shown but may be, for example, tapered non-uniformly, or formed in steps provided they are not too deep. The longitudinal section shown in Fig. 4 gives an electrical pattern substantially identical with that of the form of Fig. 2, together with a somewhat greater electrode area for any given dimensions of entering annulus and a greater degree of retardation of velocity, which may be useful in some cases. It is even permissible to utilize two plane surfaces as the opposing electrodes, abutting the edges of these planes against emulsion-confining surfaces of non-conductive material, but in using such forms it should be borne in mind that the space between the electrodes must be caused to convey the entire stream of emulsion, i. e., the electrodes must be flooded but not submerged.

We claim as our invention:

1. A process of electrical dehydration comprising: passing emulsion in a continuous flowing stream longitudinally through the annular space between a substantially cylindrical outer electrode and an inner electrode tapering inwardly in the direction of emulsion flow; passing a continuous flow of electrical current between said electrodes and through said stream, and subsequently separating the phases of said emulsion.

2. A process of electrical dehydration in which a continuous flowing stream of emulsion is resolved to a desired degree in a single passage through a progressively enlarged space between electrically energized concentric electrodes, said enlargement being due solely to progressive decrease in size of the central electrode, and in which the resolution products are immediately removed from contact with either of said electrodes.

GALE L. ADAMS.
ROY G. BARLOW.